UNITED STATES PATENT OFFICE.

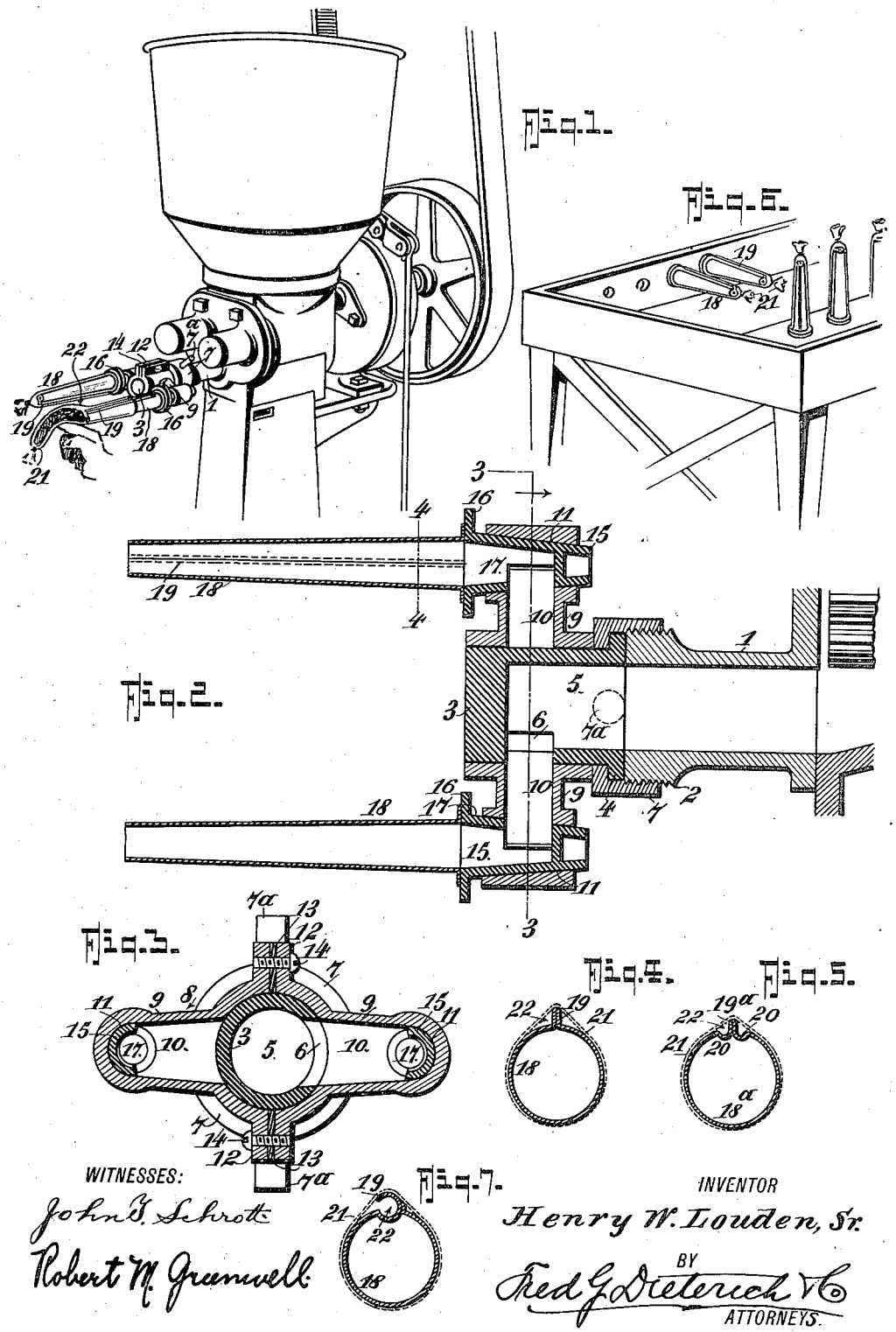

HENRY W. LOUDEN, SR., OF LEBANON, PENNSYLVANIA.

SAUSAGE-STUFFING DEVICE.

1,043,241.          Specification of Letters Patent.          Patented Nov. 5, 1912.

Application filed March 25, 1912. Serial No. 685,942.

*To all whom it may concern:*

Be it known that I, HENRY W. LOUDEN, Sr., residing at Lebanon, in the county of Lebanon and State of Pennsylvania, have invented certain new and useful Improvements in Sausage-Stuffing Devices, of which the following is a specification.

My invention relates to the art of sausage manufacture.

It has heretofore been the practice to provide machines for forcing sausage meat through a delivery spout into the gut or skin to be stuffed. One type of such machine is disclosed in my Patent #765899 of July 26, 1904. In such a machine time is lost in putting on and removing the gut from the discharge spout so that the effective action of the machine is intermittent requiring frequent stopping and starting of the feeding device.

My present invention has for its object to provide an attachment for such machine, whereby, practically, a continuous operation is attained.

To this end my invention includes a spout holder key that is secured to the discharge pipe or neck of the stuffing machine and on which a spout holder is swivelly mounted, the spout holder key having a discharge port through which the sausage meat is fed into one of a plurality of holder arm ducts, from which it passes through the corresponding spout into the gut to be stuffed. The spouts are removably inserted in the spout holder sockets so that while one sausage gut is being stuffed, the operator can be replacing the spout (from which the gut has been previously filled) by a fresh one.

The invention further resides in those novel details of construction, combination and arrangement of parts all of which will be first fully described and then be specifically pointed out in the appended claims, reference being had to the accompanying drawing, in which:—

Figure 1 is a perspective view of a portion of a sausage stuffing machine with the invention applied. Fig. 2 is a central longitudinal section of the invention. Fig. 3 is a cross section on the line 3—3 of Fig. 2. Fig. 4 is a cross section on the line 4—4 of Fig. 2. Fig. 5 is a cross section similar to Fig. 4 of a modification of the spout tube, and Fig. 6 is a detail perspective view showing how the spouts may be racked when not in use. Fig. 7 is a cross section similar to Figs. 4 and 5 of a further modification of the spout tube.

In the drawings in which like numerals and letters of reference designate like parts in all the figures, 1 is the discharge pipe or neck of the sausage stuffing machine, one end 2 of the same is threaded to receive the union 7, which secures the spout holder key 3 to the pipe 1, through the medium of the key flange 4. The key 3 is bored at 5 from one end and has a discharge port 6, through which the sausage meat is ejected.

8 designates the spout holder which is made in two sections, secured together through the medium of flanges 12 and set screws 14, leather or other resilient washers 13 are interposed at the joint so that the holder 8 can be held with greater or lesser friction on the key 3. The holder 8 is provided with a plurality (two being shown although more may be provided if desired) of arms 9 that terminate in sockets 11, which are bored in coniform to receive the conical ends 15 of the spouts proper. The spout ends 15 have flanges 16 to which the spout tubes 18, are secured by soldering or otherwise. Each spout tube 18 is formed of thin metal bent to shape and provided with an annular projection 19 so that when the gut 21 is stripped over the same, an air space 22, will be provided for the escape of air from the gut when the meat is forced into the same. The arms 9 are provided with ducts 10, with which the chamber 17 of the respective spout members 15, register.

The union 7 is formed with lugs 7ª so that it may be radially turned to loosen the connection between the pipe 1 and the member 3, and instead of making the spouts 18 with the longitudinal rigid member 19 alone, they may be made as indicated in Fig. 5, by reference to which it will be seen that the metal of the spout is grooved, as at 20, adjacent to the rigid member 19ª so that the spout 18ª may be provided with suitable air passages.

In the practical operation of the invention, while one gut is being stuffed, the operator can place a fresh discharge spout with an unstuffed gut on the same, in the holder 8, and as soon as the stuffed gut is filled by turning the holder 8 around on the member 3 until the fresh spout comes into position, the feed of material is automatically cut off from the filled spout and cut on to the spout. If desired, a suitable rack shown in Fig. 6 may be provided to hold the spouts with their unfilled guts, so that the operator may have a suitable supply on hand.

Fig. 7 is a section similar to Fig. 5 of another modification showing a different manner of forming the air escape groove 22 by bending the member 19 into a tubular form.

From the foregoing description taken in connection with the accompanying drawings, it is thought the complete construction, operation and advantages of the invention will be apparent to those skilled in the art.

What I claim is:—

1. In combination with the discharge pipe of a stuffing machine or the like, a spout holder key secured to said pipe and extending in the same longitudinal direction as said discharge pipe, a spout holder swivelly mounted on said key, said spout holder having an arm extending at right angles to the longitudinal axis of said spout holder key and terminating in a socketed head, and a spout removably held with retaining friction in said socketed head, said key, said arm, and said spout having communicating passages.

2. An attachment for sausage stuffing machines and the like comprising in combination with the discharge pipe of the sausage machine, a spout holder key, means for securing said key to the discharge pipe to extend in the same longitudinal direction as said discharge pipe, a spout holder swivelly mounted on said key, and including a plurality of arms extending at right angles to the longitudinal axis of said key and said discharge pipe and terminating in spout receiving sockets, spouts removably held with retaining friction in said sockets, and extending parallel to one another and to the longitudinal axis of said key and discharge pipe, said key having an internal chamber and a port for effecting communication with one or another of said spout holder arms, said spout holder arms having ducts coöperative with said key port and said spout socket, said spouts having a passage for delivering the material to the gut to be stuffed, and means carried by said spouts to provide an air discharge from the interior of the gut being stuffed.

3. In combination with the discharge pipe of a sausage stuffing machine, a key member, means for securing said key member over the discharge end of said pipe with its longitudinal axis in alinement with the longitudinal axis of said discharge pipe, said key member having an internal chamber into which the material is delivered, and having a lateral port through which the material is discharged, a spout holder swivelly mounted on said key and held with retaining friction, said spout holder having a plurality of radial arms provided with ducts, said arms terminating in socket members, stuffing spouts including a supporting socket piece to fit the socket member, and a spout section proper together with a guard or shield between said socket piece and said spout member proper, said spouts having their longitudinal axes held parallel to the longitudinal axis of said key and discharge pipe.

4. In combination with the discharge pipe of a sausage stuffing machine, a key member, means for securing said key member over the discharge end of said pipe, said key member having an internal chamber into which the material is delivered, and having a lateral port through which the material is discharged, a spout holder swivelly mounted on said key and held with retaining friction, said spout holder having a plurality of radial arms provided with ducts, said arms terminating in socket members, the axes of which extend at right angles to the longitudinal axes of said arms, stuffing spouts including a supporting socket piece to fit the socket member, and a spout section proper together with a guard or shield between said socket piece and said spout member proper, said spout member proper having a tubular body having an outer longitudinal rib to provide an air discharge space for the gut when in position on the spout, said spouts extending with their longitudinal axes parallel to one another and to the longitudinal axis of said key member.

5. In combination with the discharge member of a stuffing machine or the like, a spout holder key secured to said member, a spout holder swivelly mounted on said key and having arms with passages, and a spout removably held with retaining friction on said arms and in communication with the passages of the same, said key having a passage for effecting communication between the discharge member of the stuffing machine and one of said arms.

HENRY W. LOUDEN, Sr.

Witnesses:
OLIVER B. SIEGRIST,
VICTOR GARMAN.